United States Patent
Rodriguez Bravo et al.

(10) Patent No.: US 11,657,681 B1
(45) Date of Patent: May 23, 2023

(54) SYSTEM TO PREVENT FULL ATM ENCLOSURE SKIMMING ATTACKS

(71) Applicant: Kyndryl, Inc., New York, NY (US)

(72) Inventors: Cesar Augusto Rodriguez Bravo, Alajuela (CR); Desilda Toska, Alajuela (CR); David Alonso Campos Batista, Aurora (CR)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/681,014

(22) Filed: Feb. 25, 2022

(51) Int. Cl.
  *G07F 19/00* (2006.01)
  *G01N 29/14* (2006.01)

(52) U.S. Cl.
  CPC ......... *G07F 19/2055* (2013.01); *G01N 29/14* (2013.01); *G07F 19/207* (2013.01)

(58) Field of Classification Search
  CPC .................. G07F 19/2055; G06Q 20/1085
  USPC ............................................ 235/379; 705/43
  See application file for complete search history.

(56) References Cited

U.S. PATENT DOCUMENTS

| | | | |
|---|---|---|---|
| 5,945,602 A * | 8/1999 | Ross ................. | G07F 19/207 73/570 |
| 6,225,902 B1 * | 5/2001 | Gahan ............... | G07F 19/20 340/541 |
| 9,767,422 B2 | 9/2017 | Ray et al. | |
| 2006/0169764 A1 | 8/2006 | Ross et al. | |
| 2008/0296365 A1 * | 12/2008 | Schliebe ............ | G07F 19/2055 235/379 |
| 2009/0201372 A1 | 8/2009 | O'Doherty et al. | |
| 2013/0152690 A1 * | 6/2013 | Henderson ......... | G01N 29/46 73/602 |

(Continued)

FOREIGN PATENT DOCUMENTS

| | | |
|---|---|---|
| CN | 101515388 | 8/2009 |
| DE | 102010036961 | 2/2012 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Suezu Ellis
(74) *Attorney, Agent, or Firm* — Dan Housley; Andrew M. Calderon; Calderon Safran & Cole, P.C.

(57) ABSTRACT

A computer-implemented method includes: receiving by a skimming prevention system operatively coupled to a machine, a plurality of sound data from a plurality of corresponding sound sensors operatively coupled to the machine; identifying by the skimming prevention system, a type of user action input of the machine; retrieving by the skimming prevention system from a storage system operatively coupled to the machine, a baseline acoustic signature associated with the machine and corresponding to the type of user action input; comparing by the skimming prevention system, the received plurality of sound data to the baseline acoustic signature associated with the machine and corresponding to the type of user action input; and in response to a determination that the compared plurality of sound data and the baseline acoustic signature differ more than a predetermined threshold, triggering by the skimming prevention system, an execution/alert mode of the machine.

20 Claims, 10 Drawing Sheets

(56) References Cited

U.S. PATENT DOCUMENTS

| | | |
|---|---|---|
| 2013/0221989 A1 | 8/2013 | Schimbaeck et al. |
| 2014/0151450 A1 | 6/2014 | Lewis et al. |
| 2015/0091547 A1 | 4/2015 | Vasilev et al. |
| 2022/0028228 A1* | 1/2022 | Johnson .............. G07F 19/2055 |

FOREIGN PATENT DOCUMENTS

| | | |
|---|---|---|
| DE | 102012104057 | 11/2013 |
| WO | 2010123471 | 10/2010 |

OTHER PUBLICATIONS

Unknown, "Skimming", https://www.fbi.gov/scams-and-safety/common-scams-and-crimes/skimming, FBI, downloaded Jan. 12, 2022, 2 pages.

Unknown, "Anti-Skim Protection DIP and Motorized Card Readers", https://www.cumminsallison.com/us/en/products/atm/anti-skim, Cummins Allison, downloaded Jan. 12, 2022, 3 pages.

Sultan Saleem Khalaf Al Hattali et al., "Design and development for detection and prevention of ATM skimming frauds", Indonesian Journal of Electrical Engineering and Computer Science vol. 17, No. 3, ISSN: 2502-4752, DOI: 10.11591/ijeecs.v17.i3., pp. 1224-1231, Mar. 2020, 8 pages.

* cited by examiner

SYSTEM TO PREVENT FULL ATM ENCLOSURE SKIMMING ATTACKS

BACKGROUND

Aspects of the present invention relate generally to preventing financial malfeasance and, more particularly, to monitoring an automatic teller machine (ATM) with sound sensors to identify a change in expected acoustic signals caused by a full enclosure skimming device and executing an alert mode when necessary.

Automatic teller machines (ATMs) have been used for over 50 years. An ATM is a financial automation device by which account holders may access their account to perform transactions, such as deposit, withdraw, and transfer funds. Account holders typically insert their ATM, credit, or debit card into an ATM by inserting a magnetic stripe card into a slot in the ATM. An ATM reads data from the magnetic strip of the user's card and obtains a personal identification number (PIN) from the user to authenticate their usage of the ATM, typically via a numerical keypad. Some ATMs include a camera to capture video to monitor usage. There are many manufacturers for ATMs which may appear very similar or dissimilar to each other. An ATM is physically placed adjacent to a financial institution, grocery store, casino, shopping mall or other location to make it more convenient for users to access cash associated with their financial accounts without having to enter a bank to obtain cash.

SUMMARY

In a first aspect of the invention, there is a computer-implemented method including: receiving by a skimming prevention system operatively coupled to a machine, a plurality of sound data from a plurality of corresponding sound sensors operatively coupled to the machine; identifying by the skimming prevention system, a type of user action input of the machine; retrieving by the skimming prevention system from a storage system operatively coupled to the machine, a baseline acoustic signature associated with the machine and corresponding to the type of user action input; comparing by the skimming prevention system, the received plurality of sound data to the baseline acoustic signature associated with the machine and corresponding to the type of user action input; and in response to a determination that the compared plurality of sound data and the baseline acoustic signature differ by more than a predetermined threshold, triggering by the skimming prevention system, an execution/alert mode of the machine.

In another aspect of the invention, there is a computer program product including one or more computer readable storage media having program instructions collectively stored on the one or more computer readable storage media. The program instructions are executable on a machine to: receive a plurality of sound data from a plurality of corresponding sound sensors of an array of sound sensors operatively coupled to the machine; identify a type of user action input of the machine; retrieve from a storage system operatively coupled to the machine, a baseline acoustic signature associated with the machine and corresponding to the type of user action input; analyze the received plurality of sound data using one of an individual source analysis and correlation, or using a multi-input sound array conversion to a digital array; compare the analyzed plurality of sound data to the baseline acoustic signature associated with the machine and corresponding to the type of user action input; and in response to a determination that the compared plurality of sound data and the baseline acoustic signature differ by more than a predetermined threshold, trigger an execution/alert mode of the machine.

In another aspect of the invention, there is system including a processor, a computer readable memory, one or more computer readable storage media, and program instructions collectively stored on the one or more computer readable storage media. The program instructions are executable on a machine to: receive a plurality of sound data from a plurality of corresponding sound sensors operatively coupled to the machine; identify a type of user action input of the machine; retrieve from a storage system operatively coupled to the machine, a baseline acoustic signature associated with the machine and corresponding to the type of user action input; compare the received plurality of sound data to the baseline acoustic signature associated with the machine and corresponding to the type of user action input; and in response to a determination that the compared plurality of sound data and the baseline acoustic signature differ by more than a predetermined threshold, trigger an execution/alert mode of the machine, wherein the execution/alert mode is configured to perform a set of predetermined actions based on the comparison.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
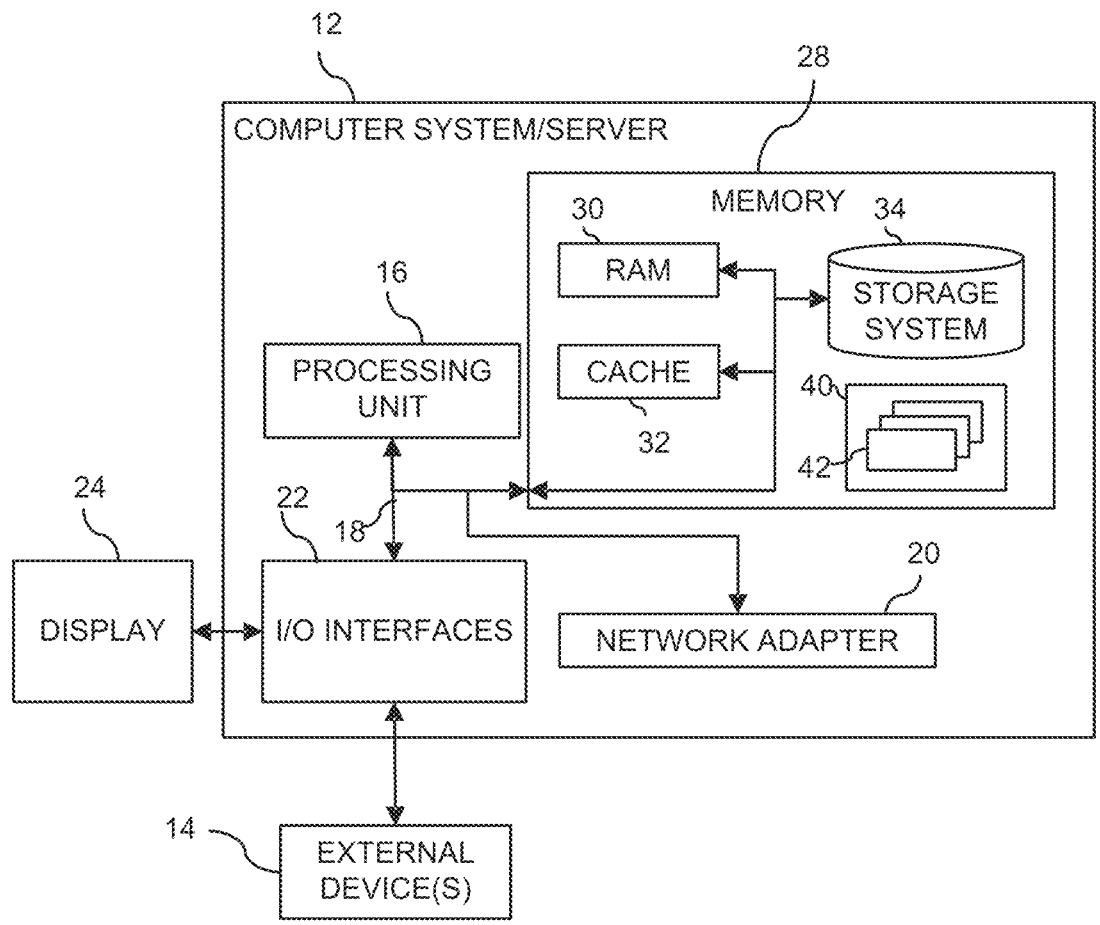
FIG. 1 depicts a cloud computing node according to an embodiment of the present invention.

Aspects of the present invention relate generally to preventing financial malfeasance and, more particularly, to monitoring an automatic teller machine (ATM) or other point-of-sale (POS) device outfitted with an array of acoustic sensors to identify a change in expected acoustic signals caused by a full enclosure skimming device. According to aspects of the invention, if any malfeasance is identified, an alert mode is executed by the system.

As the cash dispensing machines become more sophisticated and complex, bad actors are finding more ways to steal money from the banks, as well as money and private information, i.e., ATM card PINs, from users of the machines. One common method used is skimming. Skimming occurs when devices (e.g., skimmers) are illegally installed on the ATMs, point of sale (POS) terminals, or fuel pumps at gasoline stations. The skimmers can capture data or record the cardholder's PIN. Criminals use the data to create fake debit or credit cards and then steal from the victims' accounts. The Federal Bureau of Investigation (FBI) estimates that skimming costs financial institutions and consumers more than $1 billion each year.

There are several types of skimmers, for example, card reader skimmer, keypad skimmer, camera, etc. Normally an attacker needs to place at least two devices to capture the credit card information and the user's PIN. However, having two or more separate devices increases the chances of being discovered, so to avoid that, the criminals have started to create full ATM enclosures (e.g., full body skimmers) that contain all the skimmer devices in a single part. This technique is becoming popular because it has advantages of being easier to install and harder to detect.

ATM skimmer devices usually fit over the original card reader. Some ATM skimmers are inserted in the card reader, placed in the terminal, or situated along exposed cables. Pinhole cameras installed on ATMs record a customer entering their PIN. Pinhole camera placement varies widely. In some cases, keypad overlays are used instead of pinhole cameras to record PINs. Keypad overlays record a customer's keystrokes. Skimming devices store data to be downloaded or wirelessly transferred later.

In an embodiment, a computer-implemented process for detecting a hardware change on a device comprises: in response to completion of a build of the device, including an automated teller machine, establishing a set of sound level values associated with the device by a computer to form a baseline sonic signature of the device. The baseline is generated by the computer executing a plurality of tests associated with normal functions of the device to simulate real day to day operations, and receiving by the computer a first set of audio samples associated with respective normal functions from a plurality of sensors of the device to form a first plurality of sound level values. In response to activation of the device in use, the computer receives a second set of audio samples associated with respective functions of the device from the plurality of sensors to form a second plurality of sound level values. The computer determines whether the second plurality of sound level values is within a predetermined tolerance by comparing the second plurality of sound level values with the first plurality of sound level values. In response to a determination that a sound level value of a single sensor is outside the predetermined tolerance, the computer identifies the single sensor as a possible malfunctioning sensor. In response to a determination that a digital array of the second plurality of sound level values is outside the predetermined tolerance of the baseline sonic signature of the device, the computer identifies an error by the computer. In response to identifying the error by the computer, the computer executes a set of predetermined actions including alerting an organization, disabling the device, and initiating a secondary verification system.

Implementations of various embodiments provide an improvement in the technical field of skimming prevention in ATM and POS devices. In particular, the ATM/POS device includes sound sensors placed strategically on the ATM/POS device to measure sound levels emitted during both silent and operational modes of the device. An on-board computing device includes program modules for skimming prevention that are communicatively coupled to program modules for operational aspects of the ATM/POS device to ascertain the current operational mode. A baseline of sound data is retrieved from a storage system where the baseline sound data are associated with the operational mode of the device. The baseline of sound data is compared to the measured sound levels during operation. When the compared sound levels exceed a predetermined tolerance level, an execution/alert mode is triggered to perform at least one predetermined action. The predetermined actions may change the state of the device, for instance, by disabling it. Other predetermined actions include sending notifications to operators and/or users. Periodic sounds may be emitted by emitters coupled with the device to check whether the baseline of sound data falls outside of the predetermined tolerance or to update the baseline of sound data. Thus, the skimming prevention system as described herein serves to change the state of various aspects of the device and improve the field of ATM/POS use by preventing attacks on both a user's personal data and the financial costs associated with criminal skimming.

It should be understood that, to the extent implementations of the invention collect, store, or employ personal information provided by, or obtained from, individuals (for example, biometric or personal financial information collected by the ATM), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
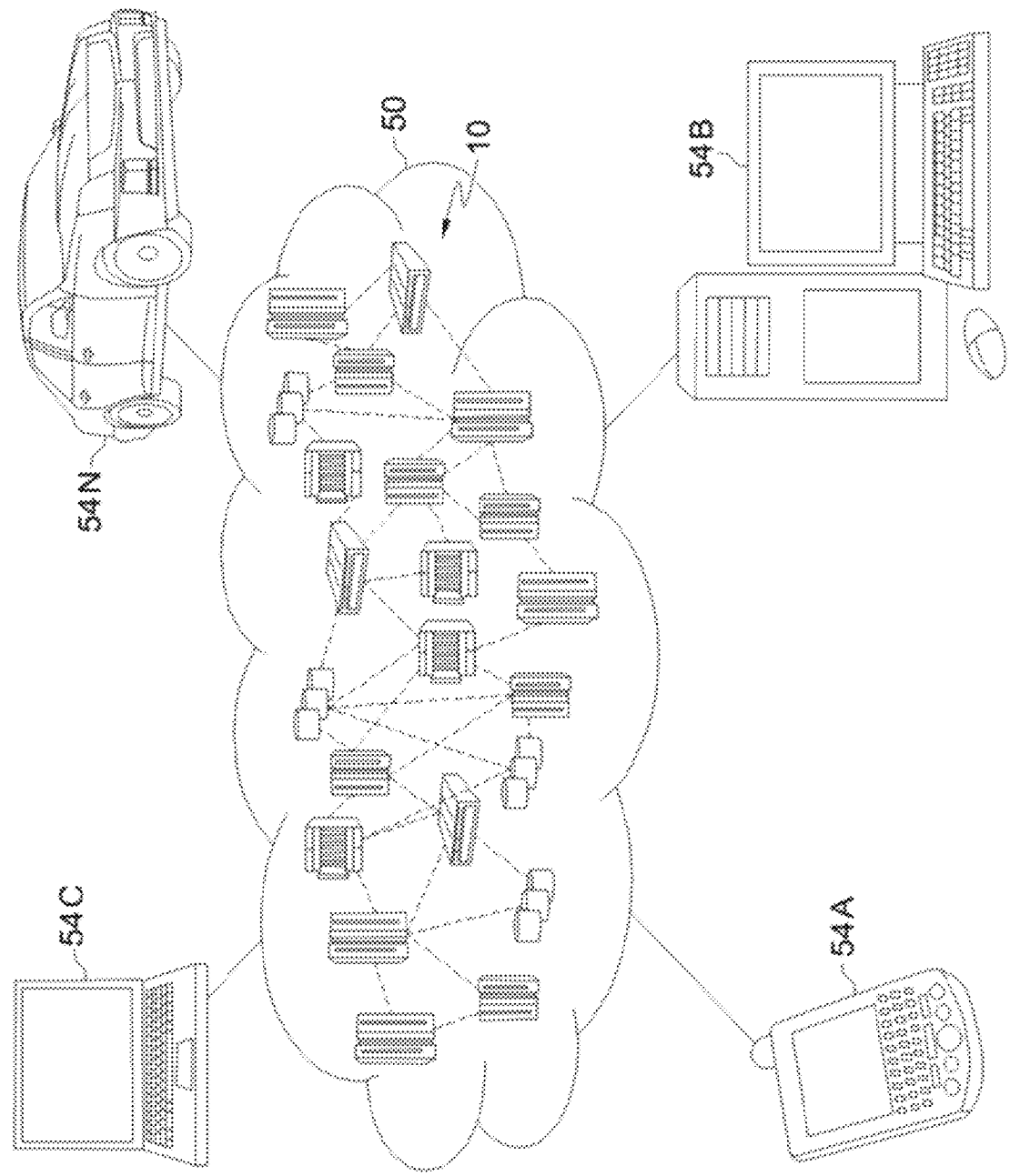
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
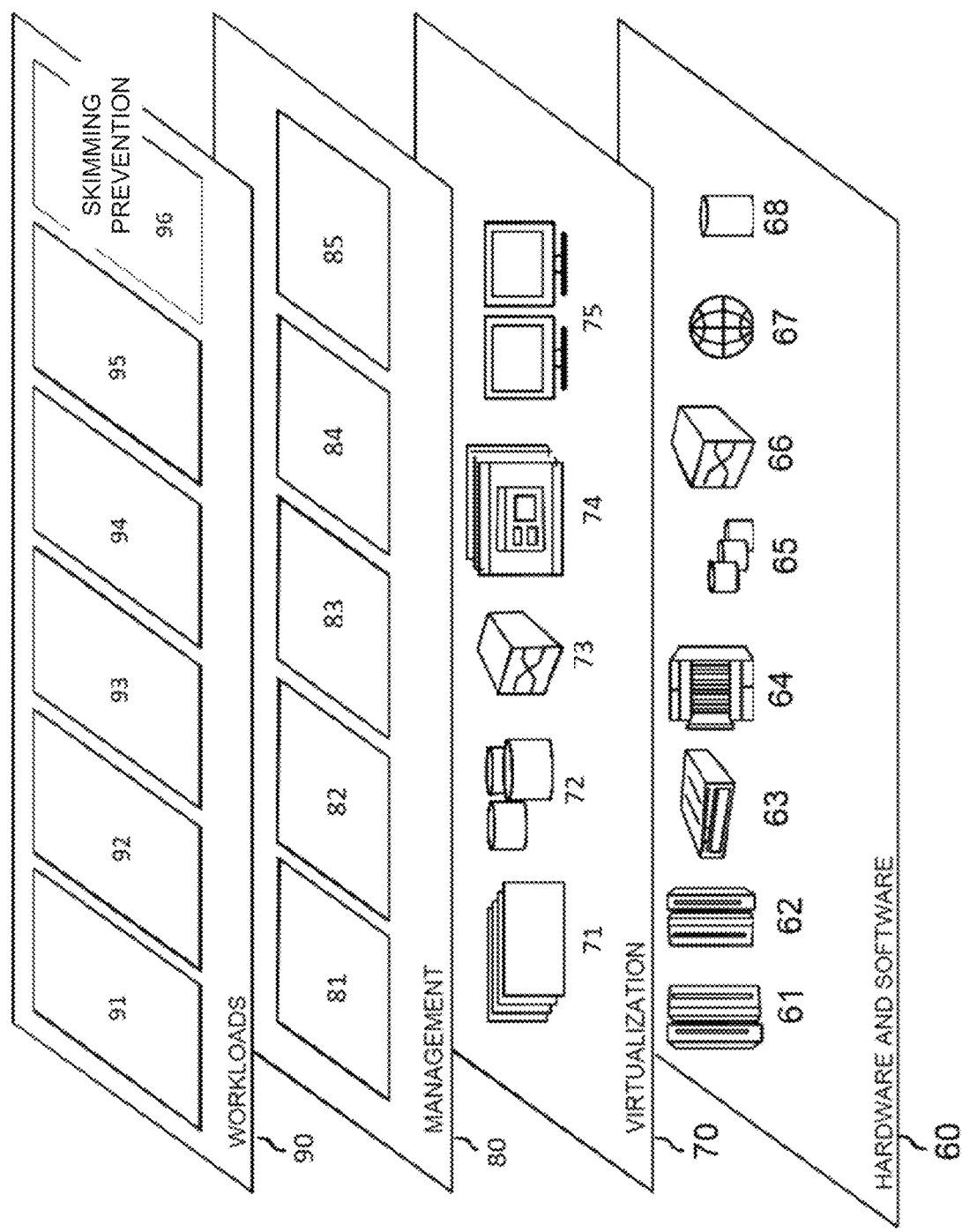
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and skimming prevention 96.

Implementations of the invention may include a computer system/server 12 of FIG. 1 in which one or more of the program modules 42 are configured to perform (or cause the computer system/server 12 to perform) one or more functions of the skimming prevention 96 of FIG. 3. For example, the one or more of the program modules 42 may be configured to: receive user action input, receive acoustic signals from sound sensors, compare signals to a baseline acoustic signature, and trigger an execution/alert mode.

Figure 4:
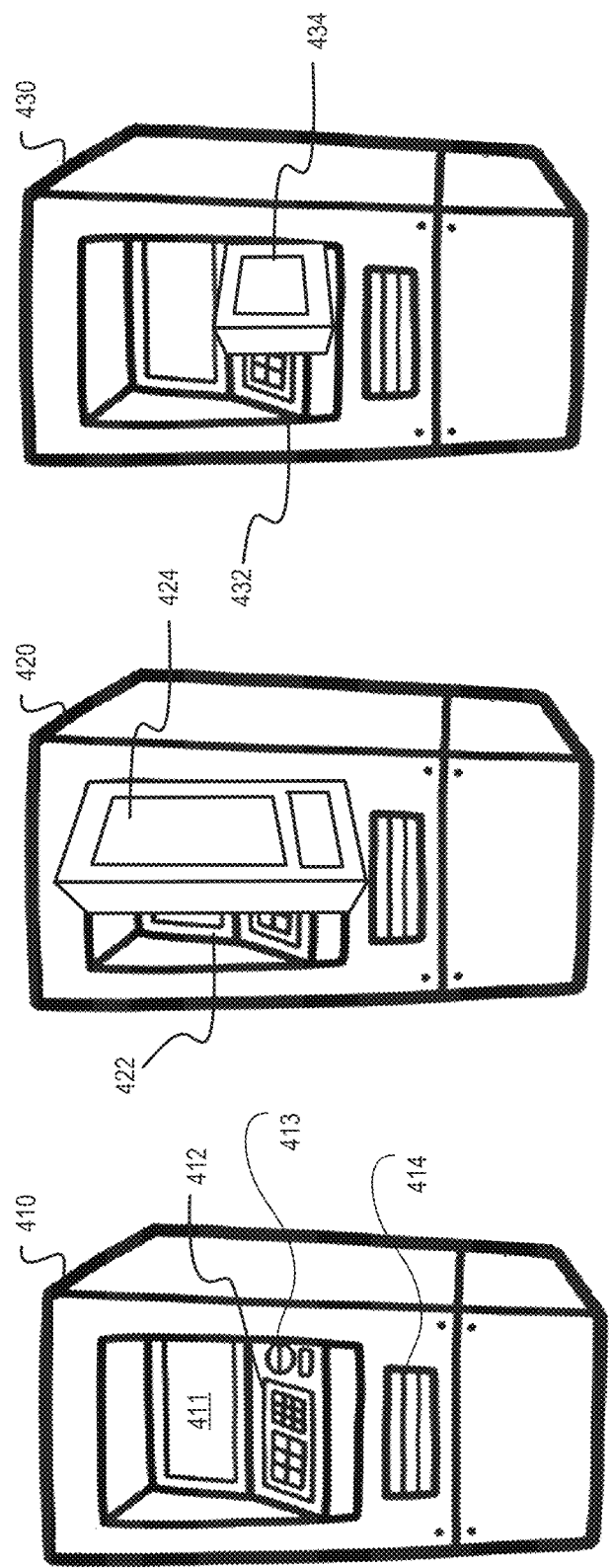
FIG. 4A is a block diagram showing an exemplary ATM in accordance with aspects of the invention.
FIGS. 4B-C are block diagrams of exemplary ATMs having installed skimming devices in accordance with aspects of the invention.

FIG. 4A shows a block diagram of an exemplary ATM 410 in accordance with aspects of the invention. In embodiments, the environment includes an automatic teller machine (ATM) 410 including a display screen 411, keyboard or touch input 412, ATM/debit card slot 413, and money dispenser 414. It will be understood that ATM 410 is used for illustrative purposes and that other configurations of ATMs may be used with various embodiments. It will also be understood that the term "ATM" is used herein to encompass both automatic teller machines and other point of service terminals, for simplicity.

FIG. 4B shows an ATM 420 with a full skimming enclosure in accordance with aspects of the invention. ATM 420 includes similar features as the ATM 410 of FIG. 4A. In this example, a full skimming enclosure 424 is installed over the user interface elements 422 (i.e., 411-413 of FIG. 4A). When the full skimming enclosure 424 is fully installed over ATM 420, it will appear to look very similar to ATM 410, so as to fool the user.

FIG. 4C shows an ATM 430 with a partial skimming enclosure in accordance with aspects of the invention. ATM 430 includes similar features as the ATM 410 of FIG. 4A. In this example, a partial skimming enclosure 434 is installed over some of the user interface elements 432 (i.e., 412-413 of FIG. 4A). In this example, the partial skimming enclosure 434 may not fully enclose the display monitor. When the partial skimming enclosure 434 is installed over ATM 430, it will appear to look very similar to ATM 410, so as to fool the user.

It will be understood that skimming enclosures may vary in look and feel from those shown in FIGS. 4B-C, but will be designed to fool the user into believing that the ATM has not been tampered with. However, the skimming enclosures are meant to steal personal and/or financial information from the user as they insert their ATM, debit or credit cards into the card slot and then enter a PIN (personal identification number) on the keypad. Biometrics such as facial identification and photos may be captured, as well as visual capture of keyclick entry, if the skimming enclosure includes a camera. However, because the skimming enclosure covers portions of the original ATM, the nature of the extra device will change the acoustic and vibration signatures of the ATM when used with the skimming enclosures.

Figure 5:
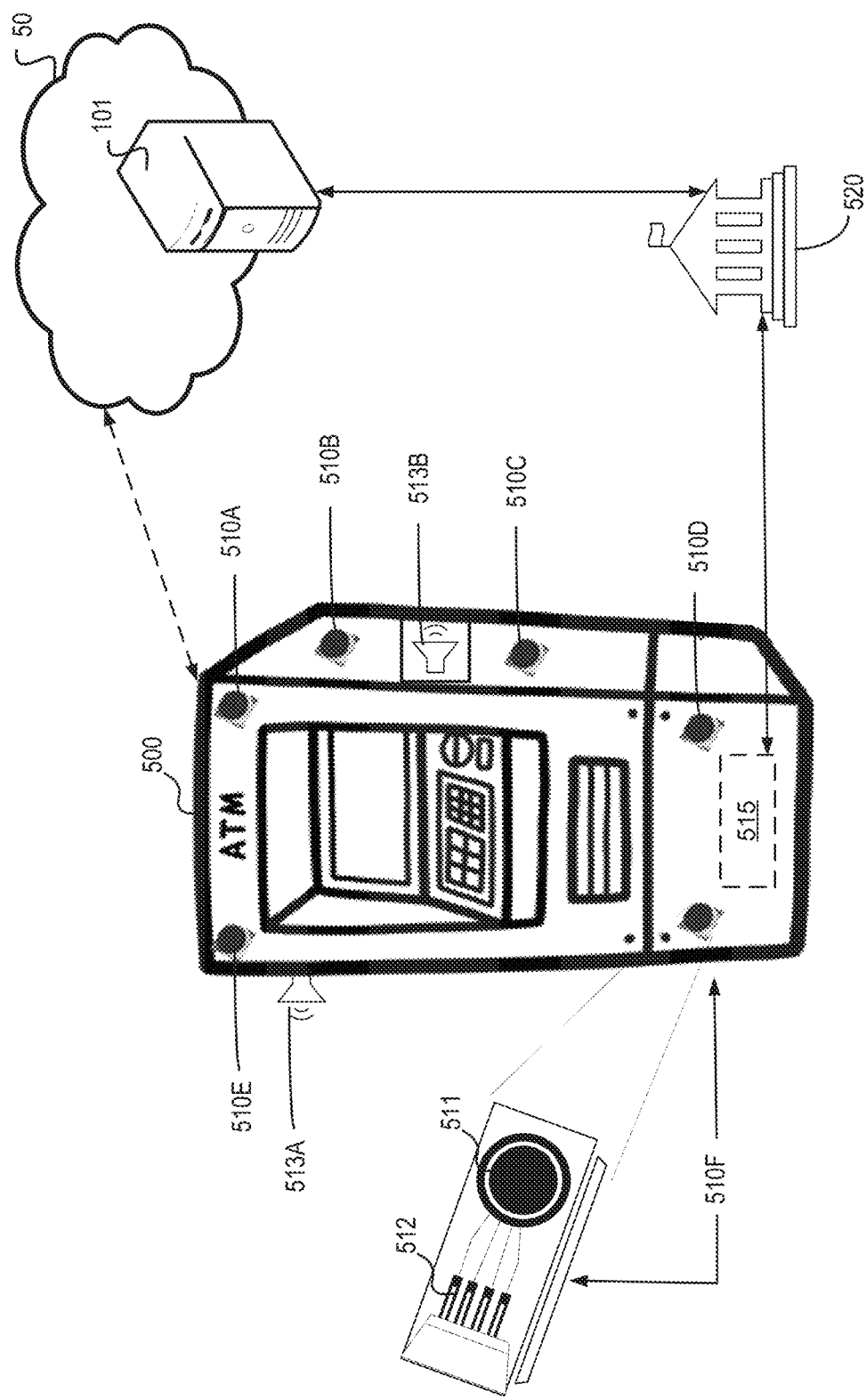
FIG. 5 shows a block diagram of an exemplary environment for ATM usage in accordance with aspects of the invention.

FIG. 5 shows an ATM including skimming prevention features in accordance with aspects of the invention. In an embodiment, ATM 500 may include similar features to ATM 410 of FIG. 4A, such as display screen 411, keyboard or touch input 412, ATM/debit card slot 413, and money dispenser 414. In an embodiment, ATM 500 includes sound sensors 510A-F. Sound sensors 510A-F, as illustrated in more detail with sound sensor 510F, may include a microphone 511, and other circuitry 512 such as a transducer, potentiometer to adjust the intensity, low power audio amplifier, LED and other passive components like resistors and capacitors. Sound sensors 510A-F may be off-the-shelf components or be designed specifically for inclusion with the ATM. In an embodiment, sound sensors 510A-F are of a same type of hardware. In other embodiments, sound sensors 510A-F may include similar and/or dissimilar hardware types. ATM 500 includes an internal on-board computing device 515 such as the computing system/server 12 of FIG. 1. In an embodiment, ATM 500 includes at least one speaker 513A or sound emitter 513B. A speaker 513A may be located strategically so that a user can hear audible messages. A sound emitter 513B may produce periodic sounds at various locations on the ATM 500 to obtain baseline acoustic signals by the sound sensors 510A-F. The on-board computing device 515 may connect to a server computer within the bank (i.e., financial institution), storefront, or enterprise 520, co-located with the ATM 500, herein referred to as the bank server 520 for simplicity, via a wired or wireless communication path. In an embodiment, the on-board computing device 515 may communicate with a remote server 101 such as cloud computing node 10 of FIG. 2, via a cloud computing environment 50, such as described in conjunction with FIG. 2. The on-board computing device 515 may communicate directly with the remote server 101 or communicate with remote server 101 via the bank server 520.

In an embodiment, program modules implementing a skimming prevention system as described herein may be a plug-in module integrated with typical ATM operational program modules executed on the on-board computing device 515. In another embodiment, program modules implementing a skimming prevention system may be executed on the on-board-computing device 515 and be communicatively coupled to a separate computing device in the ATM that includes program modules for normal ATM operation (not shown), such as authenticating users and dispensing money.

It will be understood that while six sound sensors 510A-F are shown, there may be more or fewer than six sound sensors installed on ATM 500. In embodiments, at least four sensors will provide an appropriate collection of acoustic signals for processing, while limiting false alarms. For instance, if only 1-3 sensors are used, the incidence of false alarms will increase if only one or two sensors are faulty or fail. However, embodiments as described herein will function with fewer than four sound sensors. In an embodiment, extra sensors can be placed at strategic locations inside the ATM 500 to monitor ambient sounds related to the ATM location. Examples of additional sensor locations include, but are not limited to air conditioning (A/C) unit, either internal or external, internal cooling fan, doors, or removable panels, etc. In embodiments, the sound sensors 510A-F may be placed in a somewhat symmetric fashion on the ATM 500. In other embodiments, the sound sensors 510A-F may be placed in an asymmetric fashion on the ATM 500, and seem to be randomly placed. In embodiments, some sound sensors may be placed inside the outer shell of the ATM 500 and some sound sensors may be placed on the outer surface of the ATM 500, or a combination of both inside and outside of the surface of the ATM 500. Regardless of where the sound sensors 510A-F are located, a baseline acoustic signature is collected to identify the default sound levels of the operational ATM 500, to be discussed in more detail below.

In an embodiment, the sound sensors 510A-F register sound levels, e.g., decibels. A baseline acoustic signature is a baseline of decibel readings at each sound sensor for a specific user action, or silent mode. The readings may be averaged with each other or averaged individually over several tests to generate the baseline. The baseline acoustic signature may comprise an array of average decibel readings, where each reading corresponds to a specific sensor. Thus, if a single sensor fails, that particular average reading may be omitted from the calculation to avoid false positives. In another embodiment, sound sensors 510A-F may also capture frequency shifts as well as decibel readings. In this example, the baseline acoustic signature may include both decibel and associated frequency average readings. For instance, when an object is covered with material dissimilar to the original material, such as with a full enclosure skimming device, the sound may both be muffled, as well as exhibit a slight shift in frequency of the sound when operational.

Figure 6:
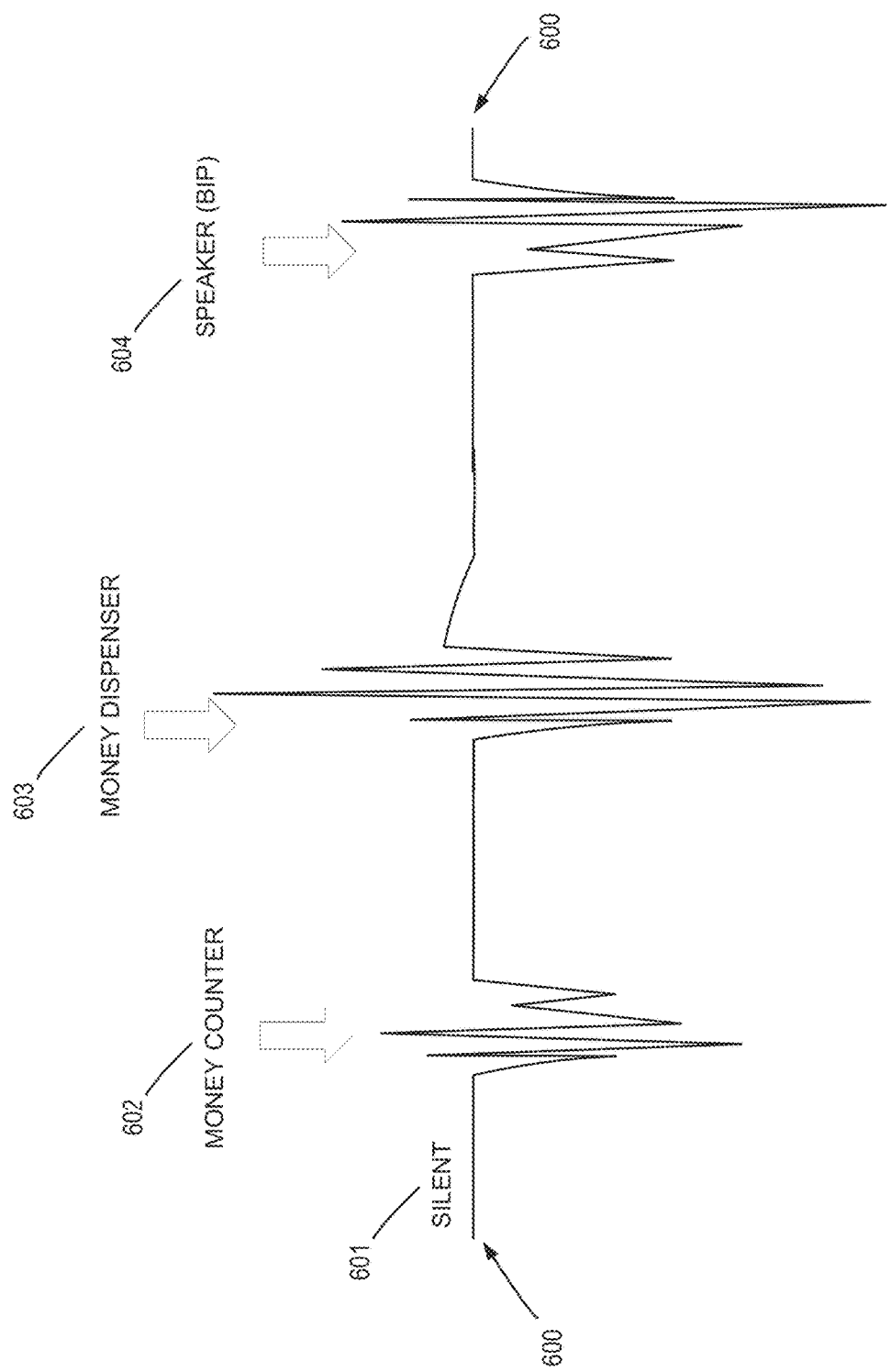
FIG. 6 shows a diagram of exemplary acoustic signatures for ATM operation in accordance with aspects of the invention.

FIG. 6 is a diagram illustrating acoustic signal 600 of an ATM, such as ATM 500 of FIG. 5, in accordance with aspects of the invention. In an embodiment, a user interacts with the ATM which results in various actions that produce different sounds. For instance, when the ATM is unused, the acoustic signature 600, as received by sound sensors 510A-F will be considered silent 601. It will be understood that the silent level 601 may not be completely silent (e.g., 0 decibels) when there is ambient noise in the environment in which the ATM is placed. In an example, a user requests money from the ATM. The action of the ATM counting the money has an acoustic signature for the money counter 602. When the money is dispensed to the user, the money dispenser has an associated acoustic signature 603. In an embodiment, the ATM includes a speaker to communicate audible messages to the user, such as advertisements, errors, alerts, etc. The speaker may have a default acoustic signature 604. The speaker may produce several different canned or default audio messages which may have different acoustic signatures. Thus, speaker acoustic signature 604 may include a collection or plurality of acoustic signatures. It will be understood that in the context of embodiments as described herein that "silent" may indicate a default or initial sound level when no ATM components are operating.

Figure 7:
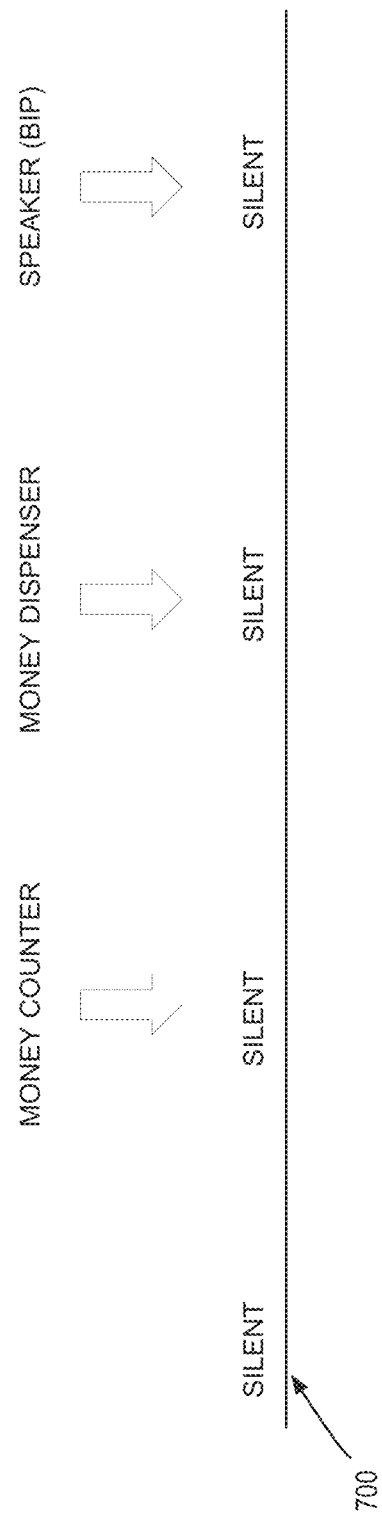
FIG. 7 shows a diagram of silent acoustic signatures for ATM operation, in accordance with aspects of the invention.

FIG. 7 is a diagram illustrating the default sound level for ATM components, such as components of ATM 500 of FIG. 5, in accordance with aspects of the invention. In this example, acoustic signature 700 is flat because no components are operating. In an embodiment, a baseline acoustic test is performed to obtain the default levels for silent and operational modes for each component/action. As discussed above, it will be understood that a "silent" level may not be 0 decibels, but may include a background noise level for the environment. The baseline acoustic signals are stored in a memory store accessible by the on-board computing device 515. The memory store may be on-board the ATM or communicatively coupled to on-board computing device on the bank server 520 or remote server 101. The baseline acoustic test may be performed in the factory or warehouse before the ATM is deployed and/or once the ATM has been deployed to its operational location, or both. In an embodiment, a periodic audible signal may be emitted to obtain current operation acoustic signals for comparison with the baseline, as more fully described in conjunction with FIGS. 9 and 10.

Figure 8:
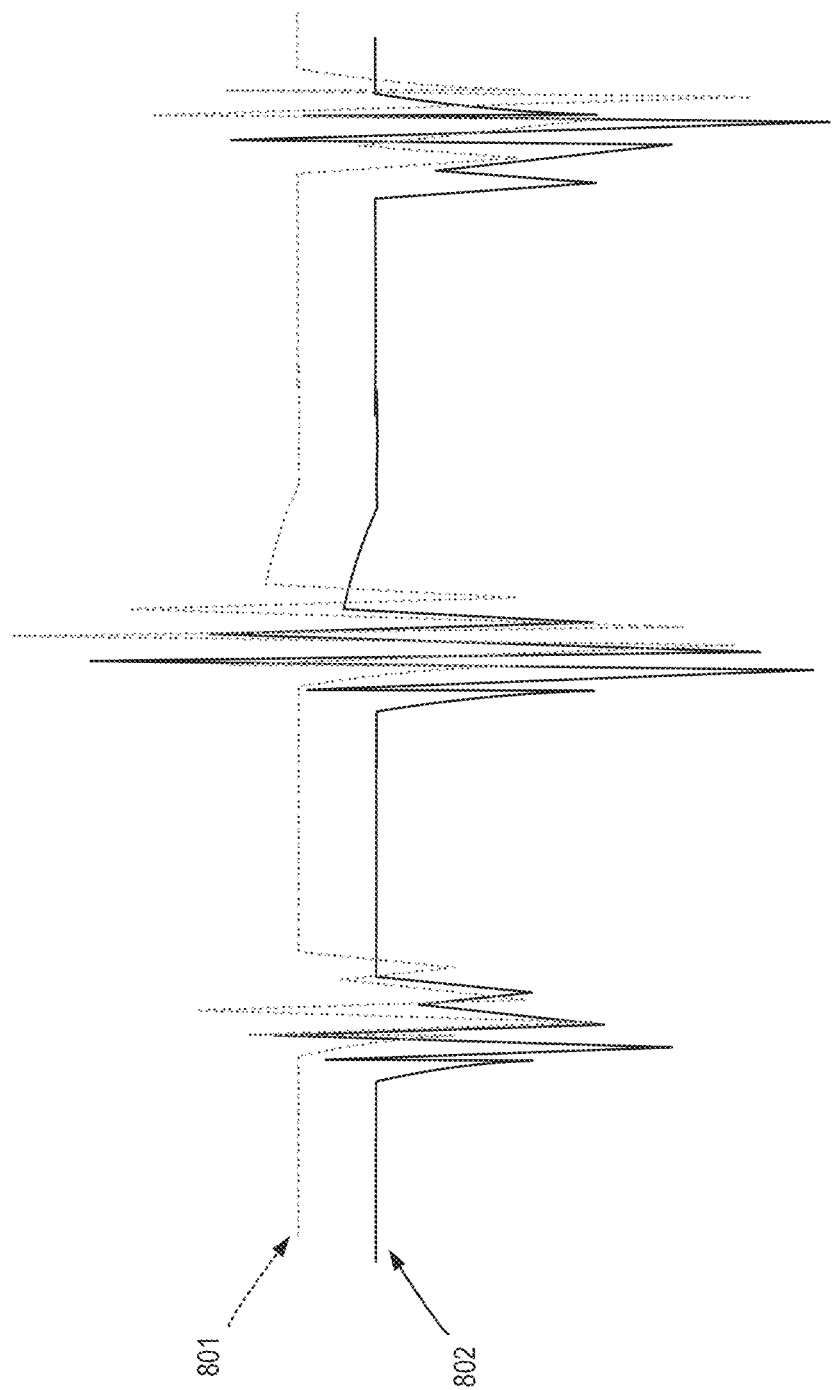
FIG. 8 shows a diagram of exemplary acoustic signatures from multiple sensors for ATM operation in accordance with aspects of the invention.

In an embodiment, an array of sound sensors may be included in the ATM. FIG. 8 is a diagram showing multiple acoustic signals in accordance with aspects of the invention. In an embodiment, the ATM, such as ATM 500 of FIG. 5, may have two configurations for the skimming prevention system, one with an individual source analysis and correlation and one with a multi-input sound array. For an individual source analysis and correlation configuration, the skimming prevention system gathers and processes each sound sensor separately. This may make the system more accurate as the comparison will be 1:1. In a multi-input sound array configuration, the skimming prevention system gathers inputs from all of the on-board sound sensors 510A-F and converts them into a digital array that is used to compare against the baseline. This configuration may save money on implementation and provide faster feedback, as well as use less processing power required. In an embodiment, the skimming prevention system uses a tolerance level of 10-15% variation to avoid false positives. Other embodiments may use varying tolerance or threshold levels. FIG. 8 shows the combination of sound sensors on a single array. It will be seen that acoustic signal 801 is similar to acoustic signal 802 in the array. Acoustic signals 801 and 802 are correlated and it will be seen that the variation is minimal. While only two acoustic signals are shown in FIG. 8, it will be understood that there will be an acoustic signal from each sound sensor in the array. Another advantage of correlating sound sensors in an array is that the skimming prevention system can identify if a single sensor is having a significant variation, which will enable the skimming prevention system to identify possible malfunctioning sensors.

Figure 9:
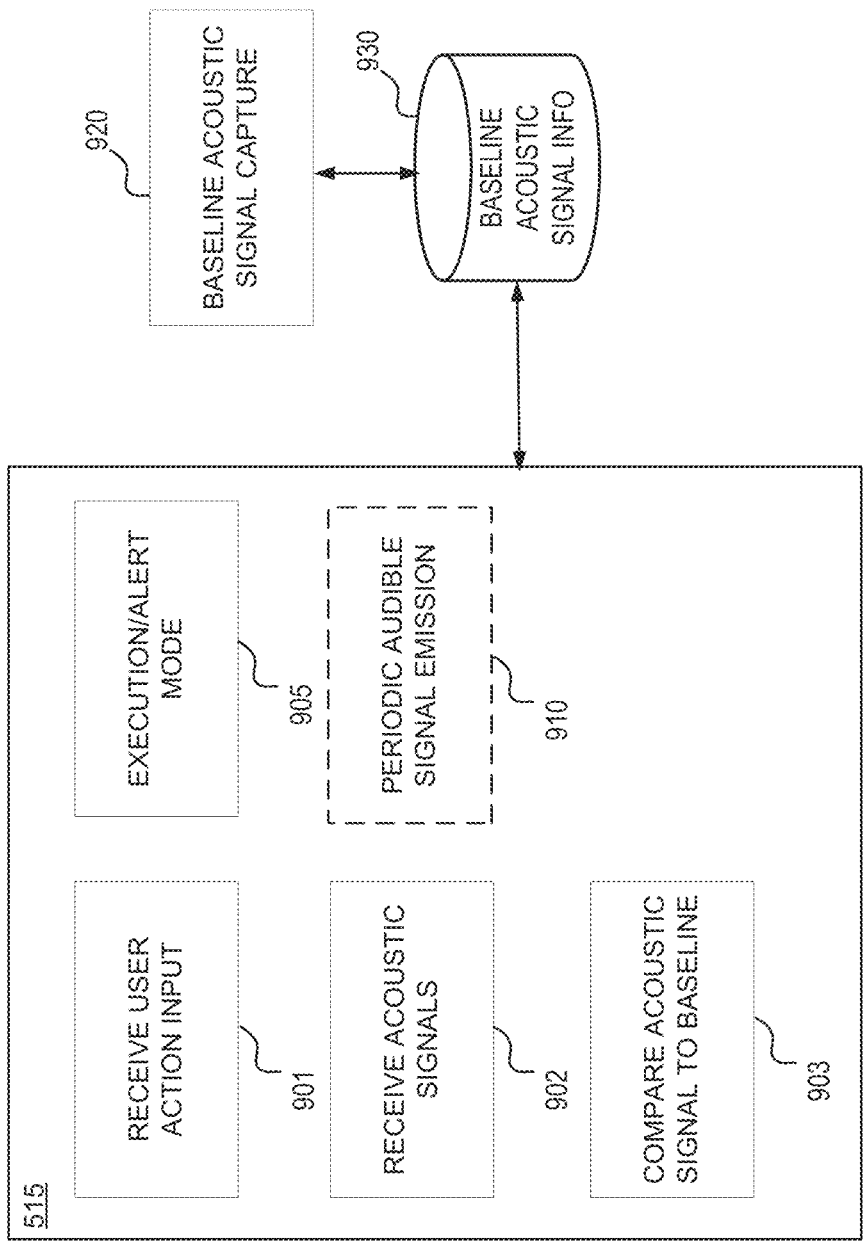
FIG. 9 is a block diagram illustrating program modules of an exemplary skimming prevention system in accordance with aspects of the invention.

FIG. 9 is a block diagram illustrating program modules of an exemplary skimming prevention system in accordance with aspects of the invention. In an embodiment, on-board computing device 515 of ATM 500 (FIG. 5) includes program modules to implement a skimming prevention system.

In an embodiment, on-board computing device 515 includes modules for receive user action input 901, receive acoustic signals 902, compare acoustic signal to baseline 903, execution/alert mode 905, and optionally, periodic audible signal emission 910. Each of the modules 901, 902, 903, 905, and 910 may comprise one or more program modules, such as program modules 42 described with respect to FIG. 1. The on-board computing device 515 may include additional or fewer modules than those shown in FIG. 9. In an embodiment, some modules or some functions of modules may be performed by remote server 101 or bank server 520 in communication with on-board computing device 515. In embodiments, separate modules may be integrated into a single module. Additionally, or alternatively, a single module may be implemented as multiple modules. Moreover, the quantity of devices and/or networks in the environment is not limited to what is shown in FIGS. 5 and 9. In practice, the environment may include additional devices and/or networks; fewer devices and/or networks; different devices and/or networks; or differently arranged devices and/or networks than illustrated in FIGS. 5 and 10.

In an embodiment, on-board computing device 515 is communicatively coupled to storage system 930 which includes baseline acoustic signal information corresponding to the type or mode of user action input. In an embodiment, a training program module for baseline acoustic signal capture 920 may be included with on-board computing device 515 or be operative on a remote device such as bank server 520, remote server 101, or a computing device of the manufacturer, etc. It will be understood that the program modules described herein may be directly or communicatively coupled to on-board computing device 515. One or more modules or features of the program modules may be operative on a remote server such as bank server 520 or remote server 101, or other computing device of the ATM 500 (not shown).

In an embodiment, the skimming prevention system of the on-board computing device 515 is communicatively coupled with other operational program modules of the ATM 500 that perform functions of the regular ATM operation. In an example, a user slides their ATM card into the ATM/debit card slot 413. This action serves to commence other features of the ATM. For instance, inserting the ATM card identifies this action to the ATM operational program modules (not shown) in order for it to prompt for user entry of a PIN. The user action is identified by the ATM operational program modules and a user action indicator (i.e., card entered, PIN entered, money counter activated, etc.) is sent to or accessible by the receive user action input module 901. For purposes of this disclosure, ATM initiated actions, such as money counting, money dispensing, etc., can also be considered as "user" action input for simplicity of explanation. The ATM operational program modules identify the type of user action input for use by the skimming prevention system.

It will be understood that the skimming prevention 96 (FIG. 3) is a workload or function that may be at least partially performed by the skimming prevention system of on-board computing device 515 (FIG. 5) and is communicatively coupled to the storage system 930 such as storage system 34 (FIG. 1). It will also be understood that the skimming prevention system as described herein is a term used for simplicity to describe the skimming prevention workloads and functions and may conceptually include program modules operatively and communicatively coupled with on-board computing device 515 to provide the desired functionality. FIG. 9 illustrates components of on-board computing device 515 and other modules as part of an exemplary skimming prevention system.

A receive acoustic signals program module 902 may be utilized to begin capture of sound data, e.g., acoustic signals, received during user action input. In an embodiment, the receive acoustic signals program module 902 may include individual source analysis of the acoustic signals. In an embodiment, the receive acoustic signals program module 902 may include a correlation feature that correlates acoustic signal information correlation with a multi-input sound array. Embodiments may use other forms of acoustic signal analysis to identify changes in the acoustic signature of the operational ATM as compared to baseline acoustic signals. In an embodiment, a baseline acoustic signature for a user action input includes an identifier of the user action (as identified by the ATM operational program modules), and a decibel reading. Another embodiment may also include frequency information in the baseline acoustic signature. Baseline acoustic signatures are stored in storage system 920. In an example, a full skimmer will muffle sounds emanating from the various components of the ATM because they will be covered with an additional layer or layers of material. Thus, variations in the decibel reading may prove to be sufficient to identify malfeasance. In an embodiment, decibel difference in the range of 10-20% may trigger an alert, as described more fully below. If a sound is not detected that corresponds to the user action input, the receive acoustic signals program module 902 may send an alert to the execution/alert mode program module 905. The failure to detect an expected sound, for instance, the money dispenser acoustic signal when a user selects to withdraw money, can indicate that one or more sound sensors 510A-F are malfunctioning or that an ATM skimmer includes sound isolating material that disrupts the acoustic signals. In an example, expected sounds may be as illustrated in FIG. 6, but when actual sounds are silent as illustrated in FIG. 7.

Once the user action input mode is identified and the acoustic signals are identified by receive acoustic signals program module 902, the received/captured acoustic signal is compared to the baseline acoustic signal that corresponds to the user action input mode (e.g., type of user action input) by compare acoustic signal to baseline program module 903. For instance, if the user action input is that the ATM card is slid into the slot, the baseline acoustic signal corresponds to sounds heard when a user slides their ATM card into the slot. If the comparison is within a predefined difference threshold, such as a 10-15% variation from the baseline, then the action is deemed nominal, as identified by the compare acoustic signal to baseline program module 903. If the comparison is not within the predefined difference threshold or tolerance, then an execution/alert mode program module 905 is triggered.

An exemplary execution/alert mode program module 905 mitigates financial losses and compromises of personal and biometric data of the user. It will be understood that the threshold to trigger execution/alert mode may be configurable by the user, i.e., operator of the ATM. In some instances, different threshold variances may trigger different actions. In an embodiment, execution/alert program module 905 may perform several functions, depending on the anomaly detected and its risk level. In an embodiment, the execution/alert mode program module 905 alerts the bank when a discrepancy in acoustic signature is detected. Once the bank is notified, the ATM may continue to operate until security personnel are available to investigate the problem, or the ATM may be immediately shut down, e.g., disabled, and put out of service. In an embodiment, a secondary verification system may be initiated, such as triggering specific audible signal emissions, and while operating selected ATM components, such as the card reader, money counter, money dispenser, speaker, etc., to help pinpoint the problem. The level of risk and ensuing actions may be selectable by the ATM operator, i.e., financial institution, or by the ATM manufacturer. In an embodiment, the default risk/action configuration may be set by the ATM manufacturer and be modified by the operator of the ATM.

In an embodiment, the secondary verification may include collecting information from other types of sensors coupled to the ATM. For instance, the ATM may include other types of verification mechanisms, such as a light sensor, pressure sensors (not shown) to help identify foreign objects applied to the surface of the ATM, etc. In an embodiment, actions and alerts following identification of acoustic signals varying from the baseline may depend on user context. For instance, if the user is accessing an ATM close to home, their card may be confiscated by the ATM which may require the user to obtain a new card and create a new PIN. If the user is accessing an ATM far from home, for instance in a foreign country, the inconvenience to the user associated with confiscating the card may be deemed too great. In this example, the user might receive an email or text message alert warning them of a possible security breach, but return their card to them so they may try another machine. In another example, the ATM may confiscate the card only when the user's card has been used to access an ATM over a predetermined number of times in a predetermined time period. This can mitigate usage of a cloned card being used frequently.

In an embodiment, the ATM may emit an audible signal at random intervals, as controlled by the periodic audible signal emission program module 910. This periodic sound emission is used as a security test to confirm that the sound is not opaque/blocked by a full-size or partial skimmer. In embodiments, baseline acoustic signal capture program module 920 may perform acoustic sampling at various times and environments to determine baseline acoustic signal information to correspond to silent mode or various user action input modes. The baseline acoustic signal information is saved in storage system 930 for later use by the compare acoustic signal to baseline program module 903. In an embodiment, initial baseline sampling may be performed in the factory during manufacture of the ATM 500. An updated baseline sampling may be performed once the ATM 500 has been deployed to its operational location to account for ambient noise, such as noise caused by road traffic, human conversation, wind, and other environmental phenomenon, etc. The periodic sound emissions are compared to the stored baseline acoustic signal information 930 by comparing acoustic signal to baseline program module 903, to ensure that the sound is not being blocked by a skimmer.

In an embodiment, a periodic audible signal may be emitted within or in proximity to the ATM, by the periodic audible signal emission program module 910. A baseline acoustic signal corresponding to the ATM state when the signal is emitted is stored with other baseline acoustic signal information in storage system 930. In an example, the baseline acoustic signal corresponds to the silent mode as shown in FIG. 7. It will be understood that the silent mode acoustic baseline may correspond to ambient noise associated with the ATM and environment when no user action input is present. Thus, the silent mode acoustic signals may be periodically sampled and compared to a baseline to identify if changes have been made to the baseline ATM configuration. The ability to identify operational sound anomalies before a user approaches and uses an ATM can help prevent skimming malfeasance before it occurs by shutting down the ATM, for instance.

Figure 10:
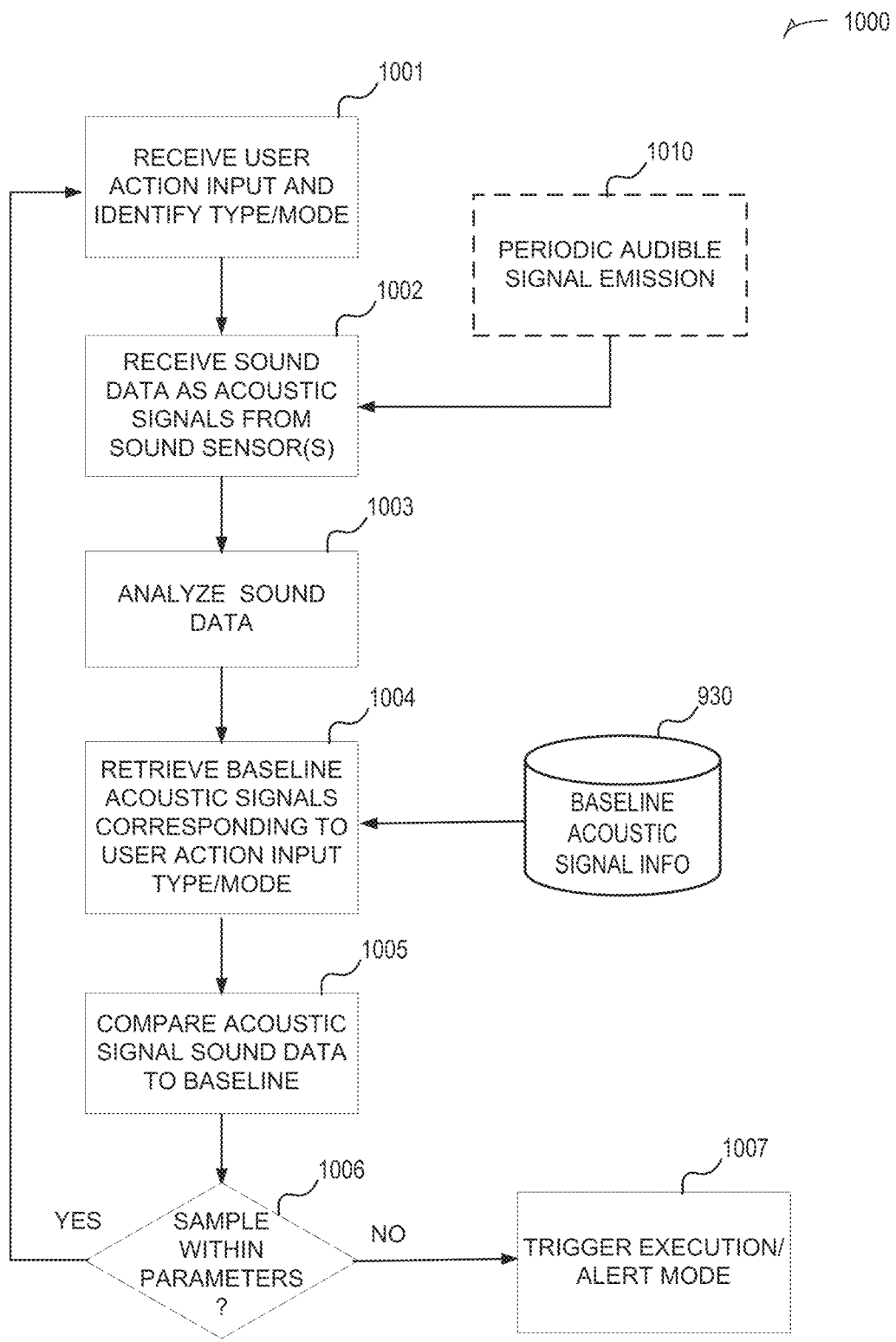
FIG. 10 shows a flowchart of an exemplary method for skimming prevention in accordance with aspects of the invention.

FIG. 10 shows a flowchart of an exemplary method 1000 in accordance with aspects of the present invention. Steps of the method may be carried out in the environment of FIG. 5 and are described with reference to elements depicted in FIGS. 5 and 9. The acoustic signals may include a baseline for silent mode, such as shown in FIG. 7, as well as baseline acoustic signals for various operational modes such as shown in FIG. 6. In an embodiment, the baseline acoustic signal information is stored in storage system 930 and directly connected to on-board computing device 515 in the ATM 500. In other embodiments, the storage system 930 having baseline acoustic signals may be communicatively coupled to on-board computing device 515 via the bank server 520 or remote server 101. In an embodiment, the storage system 930 is coupled with the on-board computing device 515 for faster response, and to make the baseline acoustic samples available if network communications are not available.

In an exemplary embodiment, user action input is received, and the type or mode of the user action input is identified by the skimming prevention system in block 1001 when a user begins or continues interacting with the ATM. In an embodiment, ATM operational program modules identify the user action input and send a corresponding type or mode information to the skimming prevention system. In an embodiment, the type of current or active user action input is stored in a location accessible both by the ATM operational program modules and skimming prevention system so that the active user action input type can be identified. In an example, components of the ATM 500 such as ATM card reader, keyboard, camera, or other components that can identify user action input or user proximity may be monitored to identify the current user action input mode. Once identifying that a type of user action input has been received, sound data as acoustic signals are captured from one or more sound sensors 510A-F, in block 1002. In an embodiment, the sound data include decibel readings. In an embodiment, sound data also include frequency data.

The received acoustic signals (e.g., sound data) are analyzed and correlated as described corresponding to FIG. 9, in block 1003. For instance, sound data may be correlated based on each individual sensor or as acoustic signal information correlated with a multi-input sound array. The analyzed sound data may be referred to as an acoustic signal or signature associated with the current user action input type/mode. Baseline acoustic signal information corresponding to the user action input type/mode is retrieved from the system storage 930, in block 1004. The received acoustic signal (i.e., analyzed sound data) is then compared to the baseline acoustic signals corresponding to the user action input mode, in block 1005. If the received acoustic signals are within a predetermined tolerance, as determined by decision block 1006, then processing continues at block 1001 to await further user action input. In an example, a partial skimming device installed over part of ATM 500 may cause only some user input actions to cause acoustic signatures outside of the predetermined tolerance, but not all. For instance, if the partial skimming device covers the keyboard input component, but not the ATM card slot, then a user action input mode of putting the card into the slot may not trigger an alert.

When a determination is made in decision block 1006 that the received acoustic signal is outside the predetermined tolerance, an execution/alert mode is triggered in block 1007. In an embodiment, execution/alert mode triggers at least one predetermined action such as: disabling the ATM, alerting an ATM operator, alerting the user, alerting the ATM manufacture, alerting law enforcement authorities, triggering a secondary verification mode, triggering an audible emission to test the baseline acoustic signals, etc.

In an embodiment, periodic audible signal emissions may be used in block 1010 to periodically monitor the ATM for changes in acoustic signatures. These periodic emissions may be triggered by the execution/alert mode and/or be configured to emit at a predetermined periodicity. Periodic acoustic checks can identify possible sensor malfunctions and newly installed skimming devices to identify issues early, thereby preventing financial losses, and preventing loss of personal data before it can occur. In an embodiment, the periodic sound emissions may be of an audible frequency or of a frequency outside of human hearing range, e.g., inaudible. The inaudible frequency range may be gathered by sound sensors 510A-F but because the emission is inaudible, it will not interfere with the hearing of the user of the ATM, i.e., be transparent to users and also criminals attempting to install a skimmer. In an embodiment, the frequency of the periodic sound emission may be selectable and customized to suit the detectible range of the sound sensors 510A-F. In an embodiment, a frequency selected for periodic emission may be chosen to better suit the material of the ATM to control variances in decibel levels more accurately.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
receiving, by a skimming prevention system operatively coupled to a machine, a plurality of sound data from a plurality of corresponding sound sensors operatively coupled to the machine;
identifying, by the skimming prevention system, a type of user action input of the machine;
retrieving, by the skimming prevention system from a storage system operatively coupled to the machine, a baseline acoustic signature associated with the machine and corresponding to the type of user action input;
comparing, by the skimming prevention system, the received plurality of sound data to the baseline acoustic signature associated with the machine and corresponding to the type of user action input; and
in response to a determination that the compared plurality of sound data and the baseline acoustic signature differ by more than a predetermined threshold, triggering by the skimming prevention system, an execution/alert mode of the machine.

2. The computer implemented method as recited in claim 1, wherein the machine comprises a point of sale (POS) terminal.

3. The computer implemented method as recited in claim 1, wherein the machine comprises an automated teller machine (ATM).

4. The computer implemented method as recited in claim 3, wherein the plurality of sound data comprises a plurality of decibel sound measurements, where each of the plurality of decibel sound measurements corresponds to one of the plurality of corresponding sound sensors, wherein the baseline acoustic signature associated with the machine and corresponding to the type of user action input comprises a plurality of baseline decibel sound measurements, wherein each of the plurality of corresponding sound sensors comprises a baseline decibel sound measurement, wherein each baseline decibel sound measurement is an average of a plurality of training sound measurements, and wherein each training sound measurement corresponds to the type of user action input captured in a training phase for one of the plurality of corresponding sound sensors.

5. The computer implemented method as recited in claim 4, wherein the baseline acoustic signature associated with the machine and corresponding to the type of user action input further comprises frequency information corresponding to the plurality of baseline decibel sound measurements.

6. The computer implemented method as recited in claim 1, wherein the plurality of corresponding sound sensors are coupled to the machine in an asymmetric configuration.

7. The computer implemented method as recited in claim 6, wherein the plurality of corresponding sound sensors comprise at least four sound sensors coupled to the machine.

8. The computer implemented method as recited in claim 1, wherein the plurality of corresponding sound sensors are coupled to the machine in a symmetric configuration.

9. The computer implemented method as recited in claim 1, wherein the predetermined threshold comprises a tolerance difference between 10-20%.

10. A computer program product comprising one or more computer readable storage media having program instructions collectively stored on the one or more computer readable storage media, the program instructions executable on a machine to:
receive a plurality of sound data from a plurality of corresponding sound sensors of an array of sound sensors operatively coupled to the machine;
convert the plurality of sound data to a digital array of sound data using a multi-input sound array conversion;
identify a type of user action input of the machine;
retrieve from a storage system operatively coupled to the machine, a baseline acoustic signature associated with the machine and corresponding to the type of user action input;
compare the digital array of sound data to the baseline acoustic signature associated with the machine and corresponding to the type of user action input; and
in response to a determination that the compared digital array of sound data and the baseline acoustic signature differ by more than a predetermined threshold, trigger an execution/alert mode of the machine.

11. The computer program product as recited in claim 10, wherein the machine comprises a point of sale (POS) terminal.

12. The computer program product as recited in claim 10, wherein the machine comprises an automated teller machine (ATM).

13. The computer program product as recited in claim 12, wherein the plurality of sound data comprises a plurality of decibel sound measurements, where each of the plurality of decibel sound measurements corresponds to one of the plurality of corresponding sound sensors, wherein the baseline acoustic signature associated with the machine and corresponding to the type of user action input comprises a plurality of baseline decibel sound measurements, wherein each of the plurality of corresponding sound sensors comprises a baseline decibel sound measurement, wherein each baseline decibel sound measurement is an average of a plurality of training sound measurements, and wherein each training sound measurement corresponds to the type of user action input captured in a training phase for one of the plurality of corresponding sound sensors.

14. The computer program product as recited in claim 13, wherein the baseline acoustic signature associated with the machine and corresponding to the type of user action input further comprises frequency information corresponding to the plurality of baseline decibel sound measurements.

15. The computer program product as recited in claim 10, wherein the plurality of corresponding sound sensors are coupled to the machine in one of an asymmetric or symmetric configuration.

16. The computer program product as recited in claim 15, further comprising program instructions to:
periodically provide signal emissions to the machine;
compare the periodic signal emissions to the baseline acoustic signature associated with at least one of a silent mode and user input mode;
determine whether the periodic signal emissions are within a predetermined tolerance level of the baseline acoustic signature associated with the at least one of a silent mode and user input mode; and
responsive to a determination that the predetermined tolerance level is exceeded, trigger the execution/alert mode.

17. The computer program product as recited in claim 16, wherein the execution/alert mode further comprises program instructions to:
notify an operator of the machine of the determination that the predetermined tolerance level is exceeded; and
perform at least one action selected from a list of actions consisting of: notifying a user of a possible breach of personal or financial data, disabling the machine from use, confiscating a card entered into the machine by the user, and initiating a secondary verification process to verify sound sensor integrity, wherein the selection of the at least one action is based at least on the determined tolerance and context of the user.

18. A system comprising:

a processor, a computer readable memory, one or more computer readable storage media, and program instructions collectively stored on the one or more computer readable storage media, the program instructions executable on a machine to:

receive a plurality of sound data from a plurality of corresponding sound sensors operatively coupled to the machine;

identify a type of user action input of the machine;

retrieve from a storage system operatively coupled to the machine, a baseline acoustic signature associated with the machine and corresponding to the type of user action input;

compare the received plurality of sound data to the baseline acoustic signature associated with the machine and corresponding to the type of user action input; and in response to a determination that the compared plurality of sound data and the baseline acoustic signature differ by more than a predetermined threshold, trigger an execution/alert mode of the machine, wherein the execution/alert mode is configured to perform a set of predetermined actions based on the comparison.

19. The system as recited in claim 18, wherein the plurality of sound data comprises a plurality of decibel sound measurements, where each of the plurality of decibel sound measurements corresponds to one of the plurality of corresponding sound sensors, wherein the baseline acoustic signature associated with the machine and corresponding to the type of user action input comprises a plurality of baseline decibel sound measurements, wherein each of the plurality of corresponding sound sensors comprises a baseline decibel sound measurement, wherein each baseline decibel sound measurement is an average of a plurality of training sound measurements, and wherein each training sound measurement corresponds to the type of user action input captured in a training phase for one of the plurality of sound sensors.

20. The system as recited in claim 19, further comprising:

at least one sound emitter configured to provide periodic signal emissions to the machine; and program instructions to:

compare the periodic signal emissions to the baseline acoustic signature associated with at least one of a silent mode and user input mode;

determine whether the periodic signal emissions are within a predetermined tolerance level of the baseline acoustic signature associated with the at least one of a silent mode and user input mode; and responsive to a determination that the predetermined tolerance level is exceeded, trigger the execution/alert mode.

\* \* \* \* \*